United States Patent
Bauer et al.

(10) Patent No.: US 8,533,230 B2
(45) Date of Patent: Sep. 10, 2013

(54) EXPRESSING MANAGEABLE RESOURCE TOPOLOGY GRAPHS AS DYNAMIC STATEFUL RESOURCES

(75) Inventors: Jeremy R. Bauer, Rochester, MN (US); Boas Betzler, Magstadt (DE); Jeffrey A. Frey, New Paltz, NY (US); Jeffery J. Van Heuklon, Rochester, MN (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 12/490,722

(22) Filed: Jun. 24, 2009

(65) Prior Publication Data

US 2010/0332490 A1    Dec. 30, 2010

(51) Int. Cl.
*G06F 17/30* (2006.01)
*G06F 7/00* (2006.01)

(52) U.S. Cl.
USPC .......... 707/791; 707/632; 707/720; 707/769; 707/802

(58) Field of Classification Search
None
See application file for complete search history.

(56) References Cited

U.S. PATENT DOCUMENTS

| | | | |
|---|---|---|---|
| 5,878,431 A | 3/1999 | Potterveld et al. | |
| 6,154,767 A | 11/2000 | Altschuler et al. | |
| 6,477,645 B1 | 11/2002 | Drews | |
| 6,578,086 B1 | 6/2003 | Regan et al. | |
| 6,738,819 B1 | 5/2004 | Li et al. | |
| 6,901,446 B2 | 5/2005 | Chellis et al. | |
| 7,152,076 B2 * | 12/2006 | Sundararajan et al. | 1/1 |
| 7,165,118 B2 | 1/2007 | Ballinger et al. | |
| 7,200,530 B2 * | 4/2007 | Brown et al. | 703/1 |
| 7,610,386 B1 * | 10/2009 | Martinez et al. | 709/227 |
| 7,698,398 B1 * | 4/2010 | Lai | 709/223 |
| 7,814,226 B2 | 10/2010 | Patrick | |
| 7,840,669 B2 | 11/2010 | Dutta et al. | |
| 8,032,557 B1 | 10/2011 | Vijendra et al. | |
| 2002/0082858 A1 | 6/2002 | Heddaya et al. | |
| 2002/0112139 A1 * | 8/2002 | Krause et al. | 712/1 |
| 2003/0055945 A1 * | 3/2003 | Bear et al. | 709/223 |
| 2003/0198189 A1 * | 10/2003 | Roberts et al. | 370/252 |
| 2004/0024877 A1 | 2/2004 | Celle | |
| 2004/0230943 A1 | 11/2004 | Pourheidari et al. | |
| 2004/0237094 A1 | 11/2004 | Vambenepe et al. | |
| 2005/0132381 A1 | 6/2005 | Fiammante et al. | |
| 2005/0222969 A1 | 10/2005 | Yip et al. | |

(Continued)

FOREIGN PATENT DOCUMENTS

CN    1691622 A    11/2005

OTHER PUBLICATIONS

Graham, Web Services Base Notification 1.3 (WS-BaseNotification) OASIS Standard, Oct. 1, 2006, pp. 1-68.*

(Continued)

*Primary Examiner* — Jung Kim
*Assistant Examiner* — James J Wilcox
(74) *Attorney, Agent, or Firm* — Cantor Colburn LLP; William A. Kinnaman, Jr.

(57) ABSTRACT

A system for managing topologies includes a topology data datastore that stores topology information. A topology computer element interfaces with the topology data datastore to create and update a topology of resources. A subscription computer element generates notifications to a user based on at least one of the creating and the updating of the topology of resources and further based on subscription data.

14 Claims, 7 Drawing Sheets

(56) References Cited

U.S. PATENT DOCUMENTS

| | | |
|---|---|---|
| 2006/0026552 A1 | 2/2006 | Mazzitelli et al. |
| 2006/0047742 A1 | 3/2006 | O'Neill et al. |
| 2006/0048097 A1 | 3/2006 | Doshi |
| 2006/0092950 A1* | 5/2006 | Arregoces et al. ............ 370/396 |
| 2006/0123116 A1 | 6/2006 | Rahman et al. |
| 2006/0146991 A1* | 7/2006 | Thompson et al. .......... 379/67.1 |
| 2006/0165040 A1 | 7/2006 | Rathod |
| 2006/0212473 A1 | 9/2006 | Carusi et al. |
| 2006/0253420 A1 | 11/2006 | Hinton et al. |
| 2006/0277606 A1 | 12/2006 | Yunus et al. |
| 2006/0288071 A1 | 12/2006 | Bigioi et al. |
| 2007/0022154 A1 | 1/2007 | Saunders et al. |
| 2007/0169199 A1* | 7/2007 | Quinnell et al. ................ 726/25 |
| 2007/0198667 A1* | 8/2007 | Behrendt et al. .............. 709/220 |
| 2007/0294366 A1* | 12/2007 | Ozzie et al. ................... 709/217 |
| 2008/0127047 A1 | 5/2008 | Zhang et al. |
| 2008/0141280 A1 | 6/2008 | Azulai |
| 2009/0043786 A1* | 2/2009 | Schmidt et al. ............... 707/100 |
| 2009/0089408 A1* | 4/2009 | Bou-Diab et al. ............ 709/220 |
| 2009/0132708 A1 | 5/2009 | Hayward |
| 2009/0144343 A1* | 6/2009 | Holt et al. ..................... 707/203 |
| 2009/0228517 A1 | 9/2009 | Arwe et al. |
| 2010/0049833 A1 | 2/2010 | Matthews et al. |
| 2010/0122328 A1 | 5/2010 | Betzler et al. |
| 2010/0131650 A1 | 5/2010 | Pok et al. |
| 2010/0235844 A1 | 9/2010 | Arwe et al. |

OTHER PUBLICATIONS

Katia Obraczka and Grig Gheorghiu, "The Performance of a Service for Network-Aware Applications", Symposium on Parallel and Distributed Tools archive, Proceedings of the SIGMETRICS symposium on Parallel and distributed tools, Welches, Oregon, United States, pp. 81-91, 1998 ISBN:1-58113-001-5.

K. Taura, K. Kaneda, T. Endo, A. Yonezawa, "Phoenix: a Parallel Programming Model for Accomodating Dynamically Joining/Leaving Resources", Principles and Practice of Parallel Programming, San Diego, California, USA pp. 216-229; 2003 ISBN:1-58113-588-2.

Robert C. Chalmer and Kevin C. Almeroth, "On the Topology of Multicast Trees", IEEE/ACM Transactions on Networking (TON), vol. 11 , Issue 1 (Feb. 2003), pp. 153-165 ISSN:1063-6692.

Lan Wu, "Service Discovery for Personal Networks" A Thesis Report, Presented to the INFOTECH Program of University of Stuttgart, pp. 1-100, Dec. 2004.

* cited by examiner

EXPRESSING MANAGEABLE RESOURCE TOPOLOGY GRAPHS AS DYNAMIC STATEFUL RESOURCES

BACKGROUND

The present invention relates to real-time system management, and more specifically, to expressing manageable resource topology graphs as dynamic stateful resources.

A resource topology includes a defined arrangement of manageable resources and the relationships between those resources. Management applications such as System Consoles, Configuration Management Applications, and Business Resilience Management have a need to reason about, visualize, and manage the various topologies that exist within a customer's environment.

Conventional representations of topologies have several functional deficiencies with respect to the creation of topology graphs as well as with respect to the lifecycle of the topology representations. For example, prior implementations generated a static graph representation from information in a database. Any changes in the resource state are not reflected in the topology representation thus, providing an out-of-date view of the topology. Any management action taken on the basis of such a view can cause inconsistencies in the configuration of the environment, and management actions can fail or even misconfigure resources in a way that will influence the execution of business applications.

SUMMARY

According to one embodiment of the present invention, a system for managing topologies is provided. The system includes a topology data datastore that stores topology information. A topology computer element interfaces with the topology data datastore to create and update a topology of resources. A subscription computer element generates notifications to a user based on at least one of the creating and the updating of the topology of resources and further based on subscription data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying drawings.

DETAILED DESCRIPTION

Figure 1:
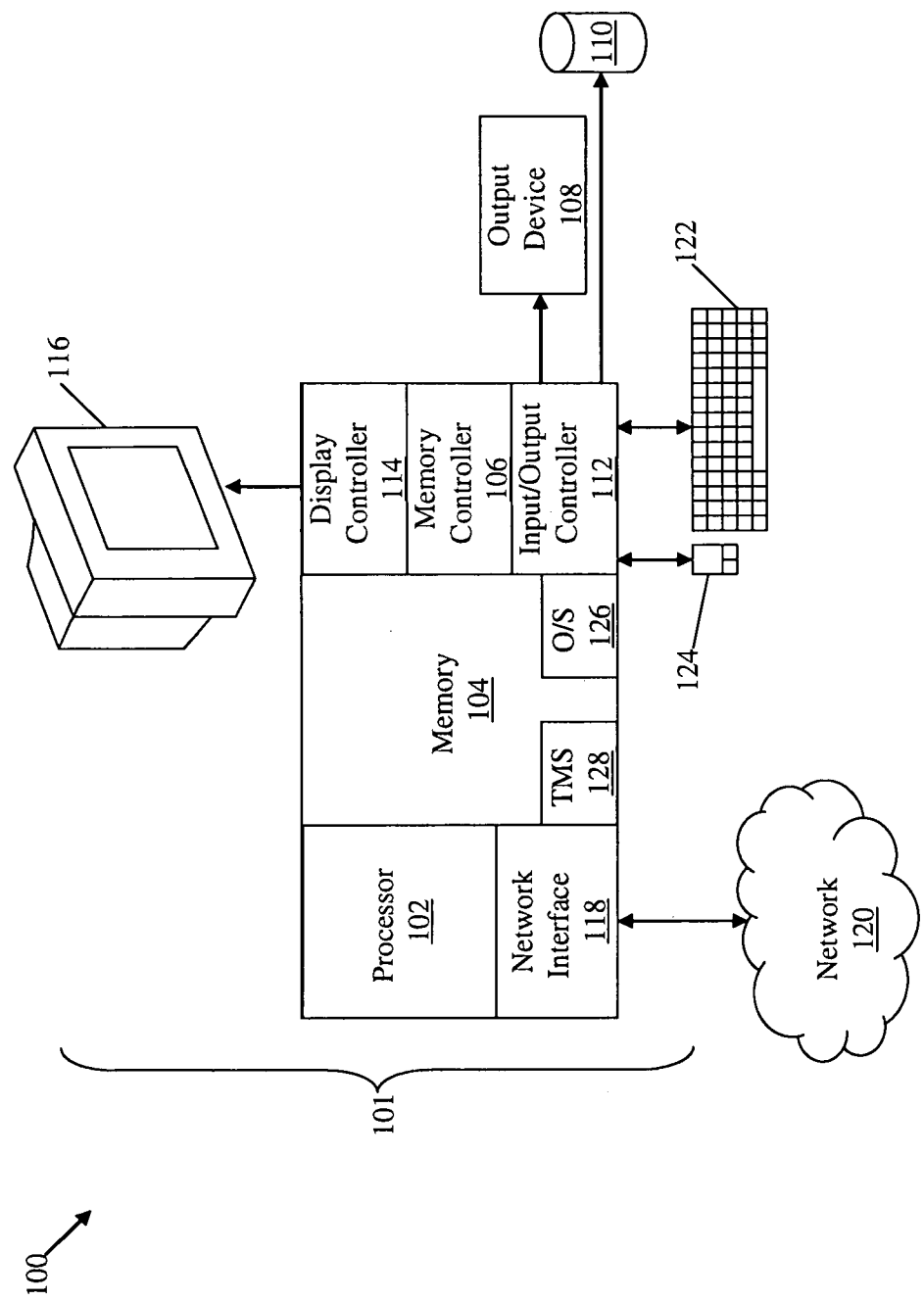
FIG. 1 is a functional block diagram of a computing system that includes a topology management system in accordance with an exemplary embodiment.

Turning now to the drawings in greater detail, it will be seen that in FIG. 1 an exemplary computing system includes a topology management system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of a topology management system (TMS) 128 of the present disclosure. In various embodiments, the topology management system 128 of the present disclosure is stored in the memory 104 (as shown), is executed from a portable storage device (e.g., CD-ROM, Diskette, FlashDrive, etc.) (not shown), and/or is run from a remote location, such as from a central server (not shown).

Figure 2:
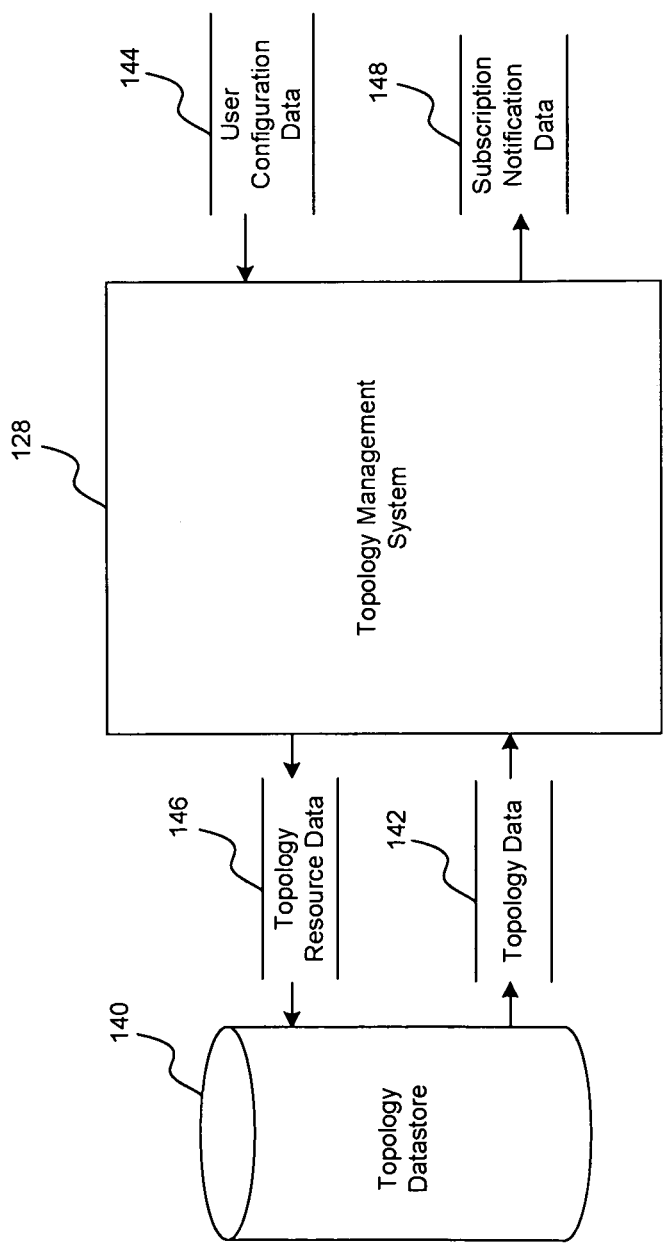
FIG. 2 is a functional block diagram illustrating a high-level overview of the topology management system of FIG. 1 in accordance with an exemplary embodiment.

The topology management system 128 is a tool that can be used by a user to create manageable resource topologies representing resources and relationships within a customer's IT environment. As shown in FIG. 2, the topology management system 128 receives input from the user. The input includes user configuration data 144 that can be entered by the user via, for example, one or more topology management user interfaces (not shown). The topology management system 128 also interfaces with a topology datastore 140. The topology datastore 140 stores various topology information (topology data 142) used to create the resource topologies. In various embodiments, the topology datastore 140 stores the newly created resource topologies according to the topology resource data 146. In various other embodiments, the newly created topologies are stored in another datastore (not shown).

In various embodiments, the topology management system 128 expresses the topologies as dynamic, stateful Web Service resources which have a well-defined lifecycle and can produce notification events. In various embodiments, the topology management system 128 permits the creation of a topology, a query for a topology, iteration over the topology, a subscription to changes in the coherency of the topology, and/or notifications when changes occur. In various embodiments, topologies can be explicitly destroyed or scheduled for time-based destruction. The output of the topology management system is provided to the user via user notification data 148. In various embodiments, the output is provided using one or more user interfaces (not shown).

With reference now to FIGS. 3-7, block diagrams illustrate an exemplary topology management system 128 implemented as Web service port types. For example, the topology management system 128 can be expressed through Web service interfaces which conform to many of the WS-* specifications. These are the same specifications used by WSDM MUWS. Specifically, the interfaces can contain operations defined by the WS-ResourceProperties, WS-BaseNotification, WS-ResourceLifetime, and WS-ResourceEnumeration specifications. This being the case, a management application interacts with the topology management system 128 similarly to how it interacts with manageable resources and relationships. In fact, resource topologies will be WS-Resources themselves and will provide many of the same operations and behaviors as manageable resources.

Although specific examples are provided herein, it is appreciated that the topology management system 128 of the present disclosure can include various implementations and is not limited to the examples provided herein.

Figure 3:
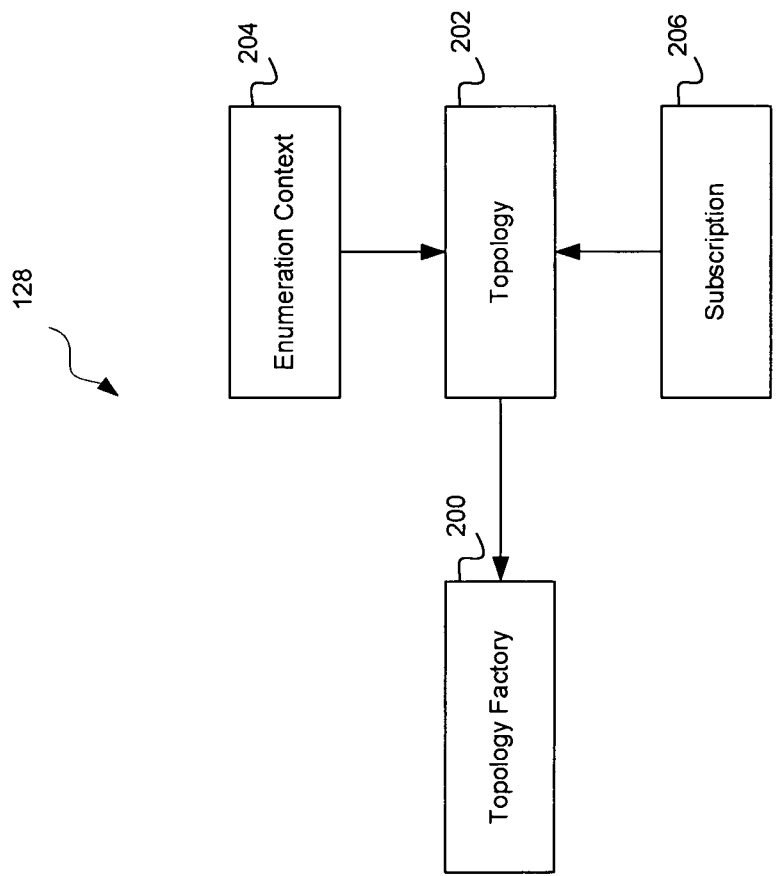
FIG. 3 is a block diagram illustrating exemplary port types and relationships of the topology management system of FIG. 2 in accordance with an exemplary embodiment.

Referring now to FIG. 3, the exemplary topology management system 128 includes a topology factory 200 in relationship with a topology 202. The topology 202 is in relationship with an enumeration context 204 and a subscription 206. Generally speaking, the topology factory 200 is a manageable resource class that includes a factory operation to create topologies. The topology 202 is implemented by topology resources created by the topology factory 200. In various embodiments, the topology 202 introduces the schema of the topology as a breadth-first ordered sequence of 'Edges.' Detailed descriptions of the various elements 200-206 will be described with respect to FIGS. 4-7.

Figure 4:
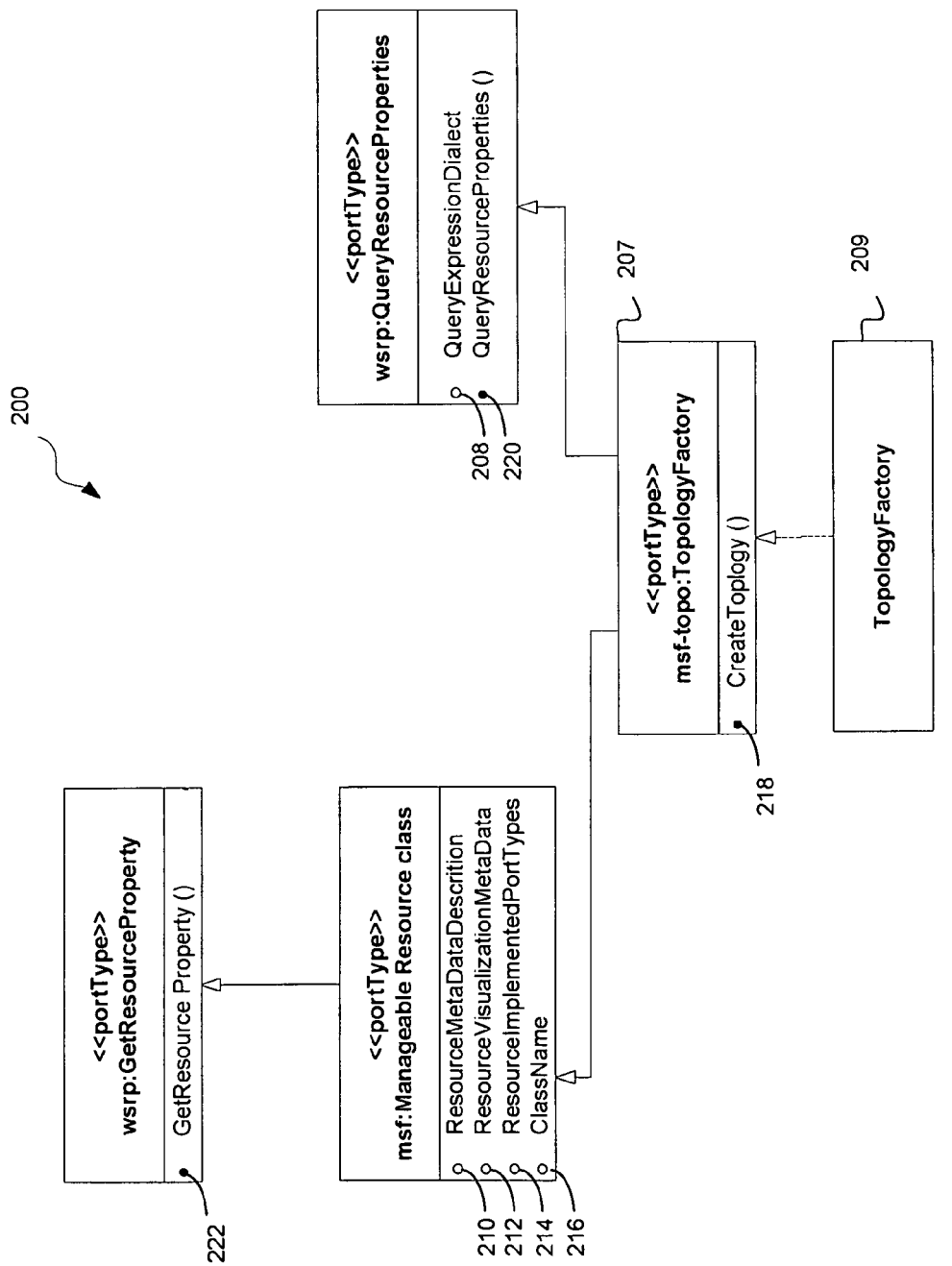
FIG. 4 is a block diagram illustrating a factory port type in accordance with an exemplary embodiment.

With reference to FIG. 4, a block diagram illustrates the topology factory 200 in accordance with an exemplary embodiment. The topology factory 200 is a manageable resource call and therefore includes class level meta-data that can be accessed via resource property operations. The topology factory port type also introduces a static operation that is used to instantiate an instance of a topology.

As shown in FIG. 4, the topology factory 200 is defined by properties and operations. The properties include a query expression dialect property 208, a resource meta-data descriptor property 210, a resource visualization meta-data property 212, a resource implemented port types property 214, and a class name property 216. In various embodiments, the resource properties are read-only and constant from a client application perspective. The operations include a create topology operation 218, a query resource properties operation 220, and get resource property operation 222.

In various embodiments, the query expression dialect property 208 describes the specific resource properties query dialect supported by a given resource instance. A non-normative example of the QueryExpressionDialect for the topology resource is shown below.

```
<wsrf-rp:QueryExpressionDialect>
    http://www.w3.org/TR/1999/REC-xpath-19991116
</wsrf-rp:QueryExpressionDialect>
```

The query expression dialect resource property is not modifiable.

The resource meta-data descriptor property 210 is used to describe additional information about the resource property values for the topology. A non-normative example of the resource meta-data descriptor property for a topology resource is shown below.

```
<msf:ResourceMetaDataDescriptor
    name="ResourceTopologyMetaDataDescriptor"
interface=http://www.ibm.com/xmlns/prod/ODOE/MS/Foundation/
ResourceTopology -1.0/ResourceTopologyPortType"
    wsdlLocation="http://www.ibm.com/ODOE/MS/Foundation/
    Topology.wsdl">
    <Property name="msf:ManageableResourceClassReference"
        mutability="mutable"
        modifiability="read-only" />
    <Property name="msf:ManageableResourceClassName"
        mutability="constant"
        modifiability="read-only" />
    <Property name="wsrf-sg:QueryExpressionDialect"
        mutability="constant"
        modifiability="read-only" />
    <Property name="wsrf-rl:TerminationTime"
        mutability="mutable"
        modifiability="read-only" />
    <Property name="wsrf-sg:CurrentTime"
        mutability="mutable"
        modifiability="read-only" />
    <Property name="msf-rts:Edge"
        mutability="mutable"
        modifiability="read-only" />
    <Property name="msf-rts:GenerationId"
        mutability="mutable"
        modifiability="read-only" />
    <Property name="wstop:TopicSet"
        mutability="constant"
        modifiability="read-only" />
    <Property name="wsnt:TopicExpressionDialect"
        mutability="constant"
        modifiability="read-only" />
    <Property name="wsnt:TopicExpression"
        mutability="constant"
        modifiability="read-only" />
    <Property name="wsnt:FixedTopicSet"
        mutability="constant"
        modifiability="read-only" />
    <Property name="wsrf-rp:QueryExpressionDialect"
        mutability="constant"
        modifiability="read-only" />
</msf:ResourceMetaDataDescriptor>
```

The resource visualization metadata property 212 provides additional metadata, such as, for example, the display name for resource properties and operations that can be retrieved based on the client's locale. There is minimal information that will be required for visualization of a topology resource. This will be an empty element.

The resource implemented port types property is metadata that allows a client application to understand the specific WSDL 1.1 portTypes that are implemented by the Class. This includes the flattened list of portType QNames with no special indication of the class's most derived portType. A non-normative example of the implemented portTypes property for a manageable resource topology is shown below.

```
<msf:ResourceImplementedPortTypes>
   <msf:PortTypeName>
      http://www.ibm.com/xmlns/prod/.../Foundation/
      ManageableResourceBase
   </msf:PortTypeName>
   <msf:PortTypeName>
      http://docs.oasis-open.org/.../wsrf-wsrp/QueryResourceProperties
   </msf:PortTypeName>
   <msf:PortTypeName>
      http://docs.oasis-open.org/.../wsrf-wsrp/GetResourceProperties
   </msf:PortTypeName>
   <msf:PortTypeName>
      http://docs.oasis-open.org/.../wsrl/ScheduledResourceTermination
   </msf:PortTypeName>
   <msf:PortTypeName>
      http://docs.oasis-open.org/.../wsrl/ImmediateResourceTermination
   </msf:PortTypeName>
   <msf:PortTypeName>
      http://docs.oasis-open.org/wsnt/2005/03/NotificationProducer
   </mrf:PortTypeName>
   <msf:PortTypeName>
      http://www.ibm.com/xmlns/prod/ODOE/.../wsrf-enumeration/
      DataSource
   </msf:PortTypeName>
   <msf:PortTypeName>
      http://www.ibm.com/www.ibm.com/xmlns/prod/.../Topology-1.0/
      Topology
   </msf:PortTypeName>
</msf:ResourceImplementedPortTypes>
```

The class name property 216 is the fully qualified name for the resource topology factory 200. A non-normative example of the class name property 216 for the topology is shown below.

```
<msf:ClassName>
   http://www.ibm.com/xmlns/prod/ODOE/MS/Foundation/ClassName/
   ResourceTopology-1.0
</msf:ClassName>
```

With regard to the operations of the topology factory, the create topology operation 218 allows a client to create a new topology resource. This operation takes a robust set of parameters which can be used to scope the topology to a specific subset of the known manageable resources and relationships in the environment. An example of the request message includes root and max depth parameters, topology rules, creation criteria, initial termination time for a scheduled destruction, and an optional subscription for synchronization.

The root parameter includes a starting manageable resource representing the starting node of the topology traversal to be performed. This property contains the value of the EPR for that manageable resource.

The max depth parameter contains the value expressing the maximum depth of relationships to be traversed from the root manageable resource. This value is used as a constraint in the generation of the topology graph.

The topology rules parameters contain the value of the set of rules used to create the topology. Topology rules are used to specify which manageable resources, relationships, and resource properties should be included in the edges of the topology graph. This is an optional element. If it is omitted, all manageable resource and relationship types are selected for inclusion in the topology. Each of the sub-elements is described in further detail below.

An include rule is used to determine if an edge will be included in the resulting topology. This will allow a port type to be specified for a starting node, a link, and a related node. The manageable resource participant or relationship represented by the respective node or link then implements the specified port type. The include rules allow the use of a special value, "ANY" for any of its parameters. ANY is a wildcard, allowing rules like: Include resources and relationships where Operating System Hosts ANY resource type. If an executed include rule results in a conflict with an executed exclude rule, a fault will be returned to the client.

An exclude rule is the opposite of the include rule, specifying which edges should explicitly NOT be included in the resulting topology. This includes the same parameters and options as those defined by the include rule parameters. If an executed include rule conflicts with an executed exclude rule, a fault will be returned to the client.

In some cases, the include rules may cause some desired edges to be skipped. Supplemental link rules allow the additional edges to be included, after the include rules have been processed. For example, if two include rules: Operating System Hosts Application and Operating System Hosts Database Instance were specified and a client knew there could also be a Uses relationship between an Application and a DatabaseInstance, but did not want a specific include rule between the Application and the DatabaseInstance, a Supplemental Relationship rule could be added to instruct the topology service to discover this link between resources already discovered by applying the include rules.

A count rule allows a named resource property to be added to the topology graph indicating the number of edges in the topology where all of the edges contain the same starting node, and the relationships represented by the links in the edges all implement a given port type, and the related nodes in the edges all implement a given specified port type. The count value can be added as an extensibility element to the start node element within the applicable topology edges which will allows the client to know that a given edge is 1 of x number of edges containing the same starting node and matching the specified count rule. This value can be displayed on a console to help guide a user when they need to choose whether to expand a leaf resource that has a large number of related resources.

A truncation rule behaves much like a count rule except that it is used to truncate the topology at a given starting node when the criteria specified in the rule has been met. A truncation threshold value is used by the client application to specify when the topology factory should truncate the topology based on the number of the same types of links and related nodes with the same starting node has been reached. The topology factory will add a named resource property as defined by the count name as an extensibility element to the start node within the applicable edge when truncation occurs. This presence of this element in the start node will act as a marker, letting the client application know that the topology was truncated at this node and that only one edge of this type from the starting node was returned. This will also allow the client application to reason about the number of similar links and related nodes that are represented by this edge in the topology. This is assumed to be used by client applications, such as the topology visualization application in the VE Foundation console, to represent the related node for such an edge as a folder including the number of similar related resources.

A property rule allows manageable resource properties extracted from a manageable resource implementing the specified port type and represented by a node or a link, to be included in the topology graph. The port type specified could be for the resources or relationships represented by the start node, link, or related node elements within an edge. The property will be included as an extensibility element within the applicable start node, link or related node element in the topology's resource property document.

Both a simple and XPath 1.0 dialect will be supported. The simple dialect allows the client application to select a property from a port type using the properties QName. The XPath dialect can be used to specify a query of the resource property documents for the resources represented by the start node, the link and the related node elements within the edge. In various embodiments, failures in attempting to select properties from a manageable resource or relationship during topology creation will not cause the topology creation to fail.

A query rule allows edges to be selected or included in the topology based on the evaluation of a query expressed as part of this element by the client application. Both a simple and XPath 1.0 dialect can be supported. The simple query dialect allows a client to select a node or a link representing a manageable resource implementing a specific port type with specific property values. For example, a query rule can be defined such that only nodes representing manageable resources implementing the Application port type with a 'name' property with a value of DB2 get included in the graph. The XPath 1.0 dialect will assume the edge should be included if the XPath expression evaluates to a Boolean true or to a non-empty, non-Boolean value without error.

An aspect of property rule allows resource properties from a manageable resource playing the role of an aspect in an aspect-of relationship with the manageable resource playing the role of the subject to be included in the edge/node representing the manageable resource playing the role of the subject. This will also allow filtering based on a subject, an aspect-of and an aspect port types. The resource properties specified can be included as extensibility elements of the start node or the related node elements representing the resource playing the role of subject in an aspect-of relationship.

A maximum edges parameter is an optional element that specifies the maximum number of edges which can be contained in a topology graph. When this value is exceeded, no topology graph will be created and a maximum edges exceeded fault will be returned to the client application.

A maximum create time parameter is an optional element that indicates the approximate maximum number of milliseconds which the topology factory is allowed to run. When this time is exceeded, no topology graph will be created and a maximum create time exceeded fault will be returned to the client application.

A visit leaf nodes parameter is an optional element that indicates whether the resource topology traversal should visit the leaf nodes after the maximum depth of the traversal has been reached to determine whether any links exist between the leaf nodes. Performance can be considerably enhanced by choosing not to visit the leaf nodes at the maximum depth. This comes at the risk of not discovering some relationships that exist between the manageable resources represented by the leaf nodes. The default value for this parameter is false, indicating not to visit leaf resources at the maximum depth.

An initial termination time parameter is an optional element that specifies the initial termination time that the topology resource should be destroyed. If the value of this parameter is xsd:dataTime, the value is interpreted as "absolute time." If the type of this parameter is xsd:duration, the value of the element is to be interpreted as "relative time" or "duration."

A subscribe parameter is an optional element that allows the client to subscribe to the topology synchronization topic at the time the topology is being created. This is a convenience, preventing the client from having to create and subscribe as two separate message exchanges. The client can assume that the subscription is created within the same atomic operation as the creation of the topology itself and therefore run within the same transactional unit of work. Requesting the subscription as part of the factory operation eliminates the race condition between the creation of the topology and the creation of the subscription where the topology may become out of sync, with no possibility to deliver the out of sync event to the caller.

An example for the create topology operation including the various parameters is found below.
<msf-rts:CreateTopology>
Required Root and Max Depth Parameters

```
<msf-rts:RootResource>wsa:EndpointReference</msf-rts:RootResource>
    <msf-rts:MaxDepth>xsd:int</msf-rts:MaxDepth>
```

Optional Topology Rules

```
<msf-rts:TopologyRules>
  <msf-rts:IncludeRules>
    <msf-rts:IncludeRule
      StartingNodePortType = QName | "msf-rts:ANY"
      LinkPortType = QName | "mfs-rts:ANY"
      RelatedNodePortType= QName | "msf-rts:ANY"
  </msf-rts:IncludeRules>
  <msf-rts:ExcludeRules>
    <msf-rts:ExcludeRule
      StartingNodePortType = QName | "msf-rts:ANY"
      LinkPortType= QName | "mfs-rts:ANY"
      RelatedNodePortType= QName | "msf-rts:ANY"
  </msf-rts:ExcludeRules>
  <msf-rts:SupplementalLinkRules>
    <msf-rts:SupplementalLinkRule
      StartingNodePortType = QName
      LinkPortType = QName
      RelatedNodePortType= QName />
  </msf-rts:SupplementalLinkRules>
  <msf-rts:CountRules>
    <msf-rts:CountRule
      StartingNodePortType = QName
      LinkPortType = QName
      RelatedNodePortType = QName
      CountName = QName />
  </msf-rts:CountRules>
  <msf-rts:TruncationRules>
    <msf-rts:TruncationRule
      StartNodePortType = QName | "msf-rts:ANY"
      LinkPortType = QName | "mfs-rts:ANY"
      RelatedNodeNodePortType = QName |
            "msf-rts:ANY"
      TruncationThreshold = integer
      CountName = QName />
  </msf-rts:TruncationRules>
  <msf-rts:PropertyRules>
    <msf-rts:PropertyRule Dialect="xs:anyURI">
      <SimpleProperyRule PortType = QName>
        <msf-rts:ResourceProperty name = QName/>
      </SimplePropertyRule> | XPath
    </msf-rts:PropertyRule>
  </msf-rts:PropertyRules>
  <msf-rts:QueryRules>
    <msf-rts:QueryRule Dialect="xs:anyURI">
```

-continued

```
    <SimpleQueryRule PortType = QName
        propertyName = QName
        propertyValue = xsd:String
        operator = "equals | not_equals |
            less_than | greater_than" /> | XPath
        </mfs-rts:QueryRule>
    </msf-rts:QueryRules>
    <msf-rts:AspectPropertyRules>
        <msf-rts:AspectPropertyRule
        SubjectPortType = QName | "rts:ANY"
        LinkPortType = QName | "rts:ANY"
        AspectPortType = QName | "rts:ANY"/>
        <msf-rts:ResourceProperty name = QName/> *
    </msf-rts:AspectPropertyRules>
</msf-rts:TopologyRules> ?
```

Additional Creation Criteria

```
<msf-rts:MaximumEdges>xsd:int</msf-rts:MaximumEdges> ?
<msfrts:MaximumCreateTime>xsd:int</msfrts:MaximumCreateTime> ?
<msf-rts:VisitLeafNodes>xsd:bool</msf-rts:VisitLeafNodes> ?
```

Initial Termination Time for Scheduled Destruction

```
        <msf-rts:InitialTerminationTime>
            [xsd:dateTime | xsd:duration]
        </msf-rts:InitialTerminationTime>
```

Optional Subscription for TopologySynchronization Topic

```
        <wsnt:Subscribe>wsnt:subscription</wsnt:Subscribe> ?
    </rth:CreateTopology>
```

If the topology is successfully created, a response message of the following form can be returned to the client application:

```
<msf-rts:CreateTopologyResponse>
    <msf-rts:TopologyReference>
        wsa:EndpointReferenceType
    </msf-rts:TopologyReference>
    <msf-rts:EdgeCount> integer value </msf-rts:EdgeCount>
    <wsrf-rl:TerminationTime>xsd:dateTime</wsrf-rl:TerminationTime> ?
    <wsrf-rl:CurrentTime>xsd:dateTime</wsrf-rl:CurrentTime> ?
    <wsnt:SubscriptionReference>
        wsa:EndpointReferenceType
    </wsnt:SubscriptionReference> ?
</msf-rts:CreateTopologyResponse>
```

Each element of the topology response message is further described below.

/msrf-rts:CreateTopologyResponse/msf-rts:TopologyReference
This element contains the EPR of the topology WS-Resource that was created.

/msrf-rts:CreateTopologyResponse/msf-rts:EdgeCount
This element contains the number of edges in the topology that was created.

/msrf-rts:CreateTopologyResponse/wsrf-rl:TerminationTime
This element contains the date and time when the topology resource will be destroyed.

/msrf-rts:CreateTopologyResponse/wsrf-rl:CurrentTime
This element contains the time as known by the topology resource.

/msrf-rts:CreateTopologyResponse/wsnt:SubscriptionReference
If the request message include a subscription to the TopologySynchronization Topic, the reference to the subscription will be returned in the create topology response message.

If the request to create a topology fails, the response message can contain one of the following faults describing the details of the failure. The client may also receive any of the faults defined in as part of the definition the subscribe message exchange. The maximum edges exceeded fault can be returned when the request message includes the optional msf-rts:CreateTopology/MaximumNodes element and the maximum node threshold has been reached attempting to create the topology. The maximum create time exceeded fault can be returned when the request message includes the optional msf-rts:CreateTopology/MaximumCreateTime element and the maximum number of milliseconds threshold has been reached attempting to create the topology.

The topology creation fault can be returned when a failure has occurred when creating the requested topology. The contents of the fault message can contain any related exception or error information that may be useful to the client application in resolving the root cause of the failure.

The get resource property operation 222 describes a property to be associated with a resource. The syntax for the get resource property operation request, response and fault messages are specified in [WS-ResourceProperties].

The query resource properties operation 220 describes the properties to be supported by a given resource. The syntax for the query resource properties operation request, response and fault messages are specified in [WS-ResourceProperties]. The XPath 1.0 query dialect will be the dialect supported.

Figure 5:
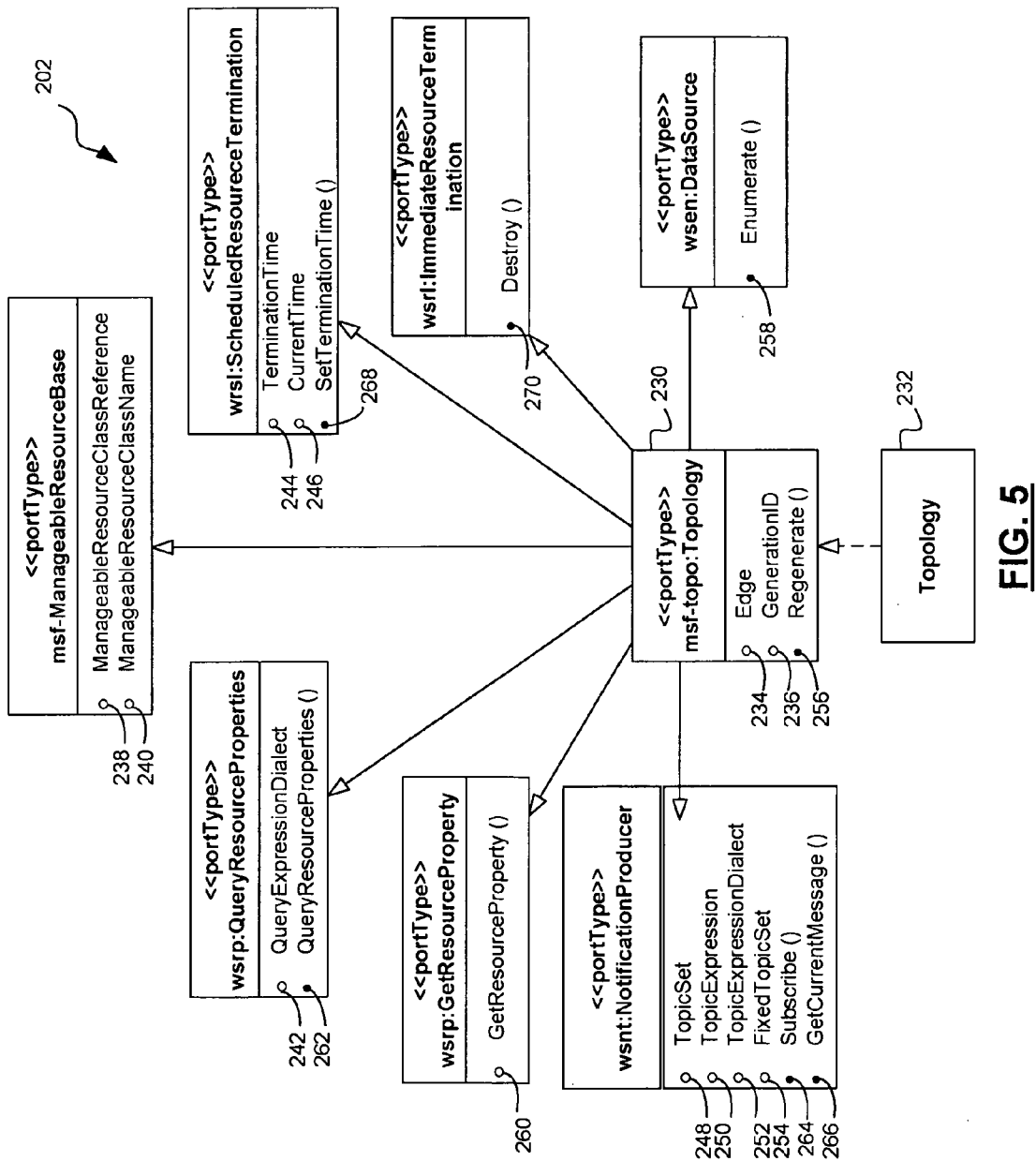
FIG. 5 is a block diagram illustrating a topology port type in accordance with an exemplary embodiment.

With reference now to FIG. 5, a block diagram illustrates the topology 202 in accordance with an exemplary embodiment. The topology 202 includes a topology port type 230 and the topology web service 232. The topology web service 232 implements a number of the WSRF and WS-N standardized port types as well as introducing a number of resource specific operations and properties that are unique to a topology.

As shown in FIG. 5, the topology port type 230 is defined by the various properties and operations. The properties include: an edge property 234, a generation identifier property 236, a manageable recourse class reference property 238, a manageable resource class name property 240, a query expression dialect property 242, a termination time property 244, a current time property 246, a topic set property 248, a topic expression property 250, a topic expression dialect property 252, and a fixed topic set property 254. The operations include: a regenerate operation 256, an enumerate operation 258, a get resource property operation 260, a query resource properties operation 262, a subscribe operation 264, a get current message operation 266, a set termination time operation 268, and a destroy operation 270.

With regard to the edge parameter 234, in various embodiments, an instance of a topology will contain zero or more edge elements. Each edge contains a starting edge node, an edge link, and one or more related edge nodes, depending on the degree of the relationship represented by the edge link. Qualifying the edge node as a starting edge node designates the node as the one visited first in that part of the breadth-first traversal that produced the subject edge in the topology. The related edge nodes are the nodes discovered through the relationship represented by the link.

A starting edge node and a related edge node further qualifies the contained node with the role it plays in the relationship represented in the edge. A node is an instance registry service group entry for the relationship participant that it represents. Likewise, a link is an instance registry service group entry for the relationship resource that it represents.

The starting edge node, the edge link, and the related edge node elements are defined to be extensible allowing child elements of type any. This allows additional resource properties and metadata to be included based on the specific rules specified as part of the topology's creation.

The edge can be further defined by various parameters. The parameters include: a starting edge node parameter, a starting edge node role name parameter, a starting edge node node parameter, an edge link parameter, a link parameter, a related edge node parameter, a related edge node role name parameter, and a related edge node node parameter.

The starting node edge parameter contains the starting node representing the manageable resource participant within the relationship represented by the edge. This parameter is extensible allowing selected resource properties specified in the creation criteria to be included.

The starting edge node role name parameter qualifies the starting node with the name of the role it plays in the relationship represented by the edge link. The starting edge node node parameter contains the instance registry service group entry for the manageable resource represented by the node. This will contain the entire entry which includes the EPR for the manageable resource and the correlation properties include in the entries content element.

The edge link parameter contains the link representing the relationship for the edge. This element is extensible allowing selected resource properties specified in the creation criteria to be included from the relationship represented by this Link. The link parameter contains the instance registry service group entry for the relationship represented by the link. This can contain the entire entry which includes the EPR for the relationship and the correlation properties include in the entries content element.

The related edge node parameter contains a related node representing the manageable resource participant within the relationship represented by the edge. This element is extensible allowing selected resource properties specified in the creation criteria to be included. For n-ary relationships, there will be n-1 related edge node elements within the edge.

The related edge node role name parameter qualifies the related node with the role that it plays in the relationship represented by the edge. The related edge node node parameter contains the instance registry service group entry for the manageable resource represented by the node. This will contain the entire entry which includes the EPR for the manageable resource and the correlation properties include in the entries content element. A topology edge resource property is read-only and mutable. That is, the edge property may be changed as a result of regenerating the topology.

An example of the edge property including the various parameters is found below.

```
<msf-rts:Edge>
  <msf-rts:StartingEdgeNode>
    <msf-rts:RoleName>xsd:String</msf-rts:RoleName>
    <msf-rts:Node>wsrf-sg:Entry</wsrf-sg:Entry>
    </msf-rts:Node>
    {any} *
  </msf-rts:StartingEdgeNode>
  <msf-rts:EdgeLink>
    <msf-rts:Link>wsrf-sg:Entry</msf-rts:Link>
    {any} *
```

```
  </msf-rts:EdgeLink>
  <msf-rts:RelatedEdgeNode>
    <msf-rts:RoleName>xsd:String</msf-rts:RoleName>
    <msf-rts:Node>wsrf-sg:Entry</msf-rts:Node>
    {any} *
  </msf-rts:RelatedEdgeNode> *
</msf-rts:Edge>
```

The generation identifier property 236 includes an identifier that represents the version of the state of the topology. The initial value of the generation identifier will be one when the topology is first created and can be monotonically increasing with each re-generation. The generation identifier can be included within all notification messages published to the topology synchronization topic. This will allow clients to ignore notifications related to previous generations of the topology that may be delivered after a new generation of the topology has been produced. A non-normative example of the generation identifier is shown below.

<msf-rts:GenerationId>1</msf-rts:GenerationId>

The generation identifier resource property is read-only and mutable.

The manageable resource class reference property 238 is a pointer back to the class resource. This can be used by clients to retrieve class level metadata for a given instance of a manageable resource. The format of the class reference is a wsa:EndpointReference. A non-normative example of the manageable resource class reference for the topology resource is shown below.

```
<mrc:ManageableResourceClassReference>
  EPR to Class resource
</mrc:ManageableResourceClassReference>
```

The manageable resource class reference resource property 238 is read-only and immutable.

The manageable resource class name property 240 is a copy of the class name from the class resource. This is provided as a convenience and an optimization to avoid requiring a client to always dereference the class pointer to obtain the instance's class name. A non-normative example of the manageable resource class name for a topology is shown below.

```
<msf:ManageableResourceClassName>
  http://www.ibm.com/xmlns/prod/ODOE/MS/Foundation/ClassName/ResourceTopology-1.0
</msf:ManageableResourceClassName>
```

The manageable resource class name resource property 240 is read-only and immutable.

The query expression dialect resource property 242 describes the specific resource properties query dialect supported at given resource instance. The topology will support the XPath 1.0 dialect as defined in [WS-ResourceProperties]. A non-normative example of the query expression dialect is shown below.

```
<wsrf-rp:QueryExpressionDialect>
  http://www.w3.org/TR/1999/REC-xpath-19991116
</wsrf-rp:QueryExpressionDialect>
```

The query expression dialect resource property 242 is not modifiable and immutable.

The termination time resource property 244 is as defined by the scheduled resource termination port type in [WS-ResourceLifetime]. This value will be initialized with the value specified by the wsnt:Subscribe/wsnt:InitialTerminationTime element at the time the subscription is created. In various embodiments, the termination time for the topology does not include a time zone designation and can therefore be represented in universal time (UTC) format. The termination time property 244 is mutable and read-only.

The current time resource property 246 is as defined by the scheduled resource termination port type in [WS-ResourceLifetime]. In various embodiments, the current time for the topology resource does not include a time zone designation and can therefore be represented in universal time (UTC) format. The current time property 246 is mutable and read-only.

The topic set property 248 for the topology resource can include one topic. Specifically, the topology synchronization topic which is used to inform clients that a change to the underlying topology has occurred suggesting the topology resource should be regenerated by the client. A non-normative example of the topic set resource property 248 for the topology is shown below.

```
<wsnt:TopicSet>
    <msf-rts:TopologySynchronization>
</wsnt:TopicSet>
```

The topic set resource property 248 is read-only and immutable.

The topic expression dialect 252 supported by the topology resource can be the simple dialect as described in [WS-Topics]. This dialect allows a root topic QName to be specified within a subscription's topic expression input message. A non-normative example of the topic expression resource property 252 for the simple dialect is shown below.

```
<wsnt:TopicExpressionDialect
    type="http://docs.oasis-open.org/wsn/t-1/TopicExpression/Simple />
```

The topic expression dialect resource property 252 is read-only and immutable.

The topology resource can further include a topic expression resource property 250 for each combination of dialect and topics supported. This will include a specification for the topology synchronization topic combined with the simple topic expression dialect. A non-normative example of the topic expression resource property 250 for topology is shown below.

```
<wsnt:TopicExpression
    Dialect="http://docs.oasis-open.org/wsn/t-/TopicExpression/Simple>
    msf-rts:TopologySynchronization
</wsnt:TopicExpression>
```

The topic expression resource property 250 is read-only and immutable.

In various embodiments, the fixed topic set property 254 is set to true. This is metadata informing the clients of a topology that the topic set is static and will not dynamically change at runtime. The fixed topic set resource property 254 is read-only and immutable.

With regard to the operations of the topology 202, the operations combined in the topology port type include the aggregation of those defined within the applicable WS-* specification in addition to those specific to the behavior of the topology itself.

The regenerate operation 256 can be used by a client application to bring the topology up to date with respect to the underlying representation of the manageable resource relationships represented in the manageable resource instance registry. This operation is assumed to be used by clients in response to messages published to the topology synchronization topic informing the client application that the topology is no longer coherent with the resources and relationships represented in the instant registry. Upon successful completion, the generation identifier is incremented and returned as part of the response message to the client application. Additional details describing the response message and potential faults is described in more detail below.

Any subscriptions that exist for the current topology will remain unchanged. Client applications consuming notification messages from the topology resource should consult the generation identifier within the notification message to ensure it is associated with the current version of the topology as expressed by the topologies generation identifier.

Any enumeration resources that exist at the time this operation is called will be destroyed as part of the topology regeneration process. Any subsequent access to an enumeration (e.g. an attempt to pull an edge) will result in a resource unknown fault. Upon receiving this fault, the client application will need to recreate the enumeration using the enumerate operation on the re-generated topology.

There are no specific parameters required as part of the regeneration requests message. The topology will be regenerated based on its original criteria specified as part of the topology's creation. If the client application would like to change any of the creation criteria or rules, the topology should be destroyed and recreated.

The response to the regenerate request message is of the following form:

```
<msf-rts:RegenerateResponse>
    <msf-rts:EdgeCount> integer value </msf-rts:EdgeCount>
    <msf-rts:GenerataionId> integer value </msf-rts:GenerationId>
</msf-rts:RegenerateResponse>
```

Failures in re-generating the topology can result in one of the specific faults defined as part of the create topology operation. There are no new or additional faults defined by this operation.

The enumerate operation 258 is a [WS-ResourceEnumeration] hybrid used to create a WSRF enumeration resource that can be used by the clients to iterate over a large result set. In this case, the enumerate operation 258 is the factory used to create an enumeration WS-Resource.

The optional wsen:Enumerate/wsen:EndTo element will not be supported. A use case requiring asynchronous notification signaling an abnormal termination of an enumeration context has not been identified within the VE Foundation. If at a later time this is determined to be required, WS-ResourceLifetime resource termination notifications can be used.

It is assumed that the implementation of the topology resource maintains the state of the context that it creates and will therefore be required to support time based expiration. This would be used to avoid a client from inadvertently orphaning a context. The topology resource can support both specific time and duration types of scheduled destruction.

The topology resource will not support the optional wsen:Enumerate/wsen:Filter element. It is assumed that any filtering would be done as part of the creation of the topology by specifying a filter criterion. This element will be silently ignored if present within the wsen:Enumerate request messages.

The syntax for the enumerate operation request, response and fault messages are specified in [WS-ResourceEnumeration] with one exception. The wsen:Expires element is not supported by WS-ResourceEnumeration. This element is used to set the initial termination time consistent with other WSRF/WS-N scenarios (i.e. setting initial termination time of service group entries, subscriptions, etc.).

The implementation of the enumeration will be via delegation to an underlying DB2 cursor on database used within the topology resource's implementation. The creation of the enumeration will result in opening a DB2 cursor. To maximize concurrency, the cursor can be opened with an isolation level of 'CURSOR STABILITY' which will result in read locks on the row of the current cursor position. The DB/2 cursor will remain open until the enumeration WS-Resource is destroyed.

The lifecycle of all enumeration resources created by the topology can be coupled with the specific version of the topology as expressed by the generation identifier resource property 236. That is, when the topology is destroyed or re-generated, all outstanding associated enumerations can be destroyed. A subsequent attempt to pull an edge from the enumeration that has been destroyed will result in a resource unknown fault.

The syntax for the GetResourceProperty operation request, response and fault messages are specified in [WS-ResourceProperties].

The syntax for the QueryResourceProperties operation request, response and fault messages are specified in [WS-ResourceProperties]. The XPath 1.0 query dialect will be the only dialect supported.

The syntax for the subscribe operation 264 request, response, and fault messages are specified in [WS-BaseNotification]. The only TopicExpression and TopicExpressionDialects will be those defined above and available to clients as resource properties. Any others will result in returning an invalid topic expression fault. wsnt:Subscribe/wsnt:wsnt:Filter/wsnt:ProducersProperties will not be supported. If this element is sent as part of the subscribe message, it will be silently ignored. Scheduled destruction of the subscription resource will be supported and therefore wsnt:Subscribe/wsnt:InitialTerminationTime will be honored as defined in [WS-BaseNotification].

Message content filters will be supported as specified via wsnt:Subscribe/wsnt:Filter/wsnt:MessageContent element. The supported dialect will be XPath 1.0. Any other dialect will result in an InvalidFilterFault. There will be no support for subscription policies. Subscribe messages containing wsnt:Subscribe/wsnt:SubscriptionPolicy element will result in an UnrecognizedPolicyRequestFault.

The lifecycle of all subscription resources created by the topology resource will be coupled with the lifecycle of the registry itself That is, when the topology is destroyed all subscriptions that it has created will also be destroyed.

The topology resource will not provide any caching for the notification messages it sends, so therefore will always respond to the GetCurrentMessage operation with the NoCurrentMessageOnTopic fault.

The set termination time is used by the client to adjust the termination time for the enumeration WS-Resource. Both absolute and duration types of adjustments will be supported to the termination time resource property. The syntax for the SetTerminationTime operation request, response and fault messages are specified in [WS-ResourceLifetime].

The destroy operation 270 is used to destroy the instance of a topology resource. Any subscription resources that have been created for the topology are explicitly destroyed as part of the topology resource destruction. Any enumeration resources that have been created for the topology are explicitly destroyed as part of the topology resource destruction. The syntax for the destroy operation 270 request, response, and fault messages are specified in [WS-ResourceLifetime].

With respect to notifications, a topology resource will accept subscriptions and publish notifications to the topology synchronization topic. Event messages published to this topic are used to inform client applications that the topology is no longer coherent with the topology represented by the manageable resource instance registry entries representing the manageable resource and relationships in the graph. This will allow the client application to re-generate the topology if appropriate for its specific applications usage.

The messages published to the topology synchronization topic informs the client application about the specific link or node that was changed (added or removed) that resulted in the triggering of the event. Specifically, the messages can include the following: link added messages, link removed messages, and node removed messages.

The link added message contains the link element that represents a relationship that has been added to the manageable resource instance registry. The addition of this entry in the instance registry results in a change to the resource topology if re-generated. The link removed message contains the link element that represents a relationship that has been removed from the manageable resource instance registry. The removal of this entry in the instance registry results in a change to the resource topology if re-generated.

The node removed message contains the node element that represents a manageable resource that has been removed from the manageable resource instance registry. The removal of this entry from the instance registry would result in a change to the topology if re-generated.

Note that there is no specific message for "Node Added." An additive change to the topology is recognized by a link representing a manageable relationship being added that would result in a corresponding edge in the topology if the graph were to be re-generated. This is determined by the topology when a new entry is added to the instance registry that represents a relationship in which one or more of the relationship participants are represented as a node in the current topology, and the relationship would have been selected to be part of the topology based on the topology creation rules.

Topology synchronization events are related to a specific version of the topology as represented by the generation identifier resource property. In other words, the messages published to the topology synchronization topic are required to include the generation identifier element. This will be used by client applications to recognize and ignore events that are associated with early versions of the graph. This is required to address the timing window that exists while a topology is being regenerated.

The content of the messages published to the topology synchronization topic can be included in a WSDM Event Format container (a.k.a. envelope). WSDM also requires the management event to contain a situation element providing contextual information about the event.

An example node removed message that may be published to the topology synchronization topic by the topology resource is shown below.

```
<wsnt:NotificationMessage>
  <wsnt:SubscriptionReference>
    wsa:EndpointReference
  </wsnt:SubscriptionReference>
  <wsnt:Topic Dialect="xsd:anyURI">
    msf-rts:TopologySynchronization
  </wsnt:Topic>
  <wsnt:ProducerReference>
    wsa:EndpointReference
  </wsnt:ProducerReference>
  <wsnt:Message>
    <muws-p1-xs:ManagementEvent muws-p1-xs:ReportTime=
    "xs:dateTime">
      <muws-p1-xs:EventId>xs:anyURI</muws-p1-xs:EventId>
      <muws-p1-xs:SourceComponent>
        <muws-p1-xs:ComponentAddress>
          EPR of topology resource
        </muws-p1-xs:ComponentAddress>
      </muws-p1-xs:SourceComponent>
      <muws-p2-xs:Situation>
        <muws-p2-xs:SituationCategory>
          muws-ps-xs:DestroySituation
        </muws-p2-xs:SituationCategory>
      </muws-p2-xs:Situation>
      <msf-rts:NodeRemovedNotification>
        <msf-rts:GenerationId>1<msf-rts:GenerationId>
        <msf-rts:Node>
          <wsrf-sg:Entry>
            instance registry service group entry
          </wsrf-sg:Entry>
        </msf:topo:Node>
      </msf-rts:NodeRemovedNotification>
    </muws-p1-xs:ManagementEvent>
  </wsnt:Message>
</wsnt:NotificationMessage>
```

Figure 6:
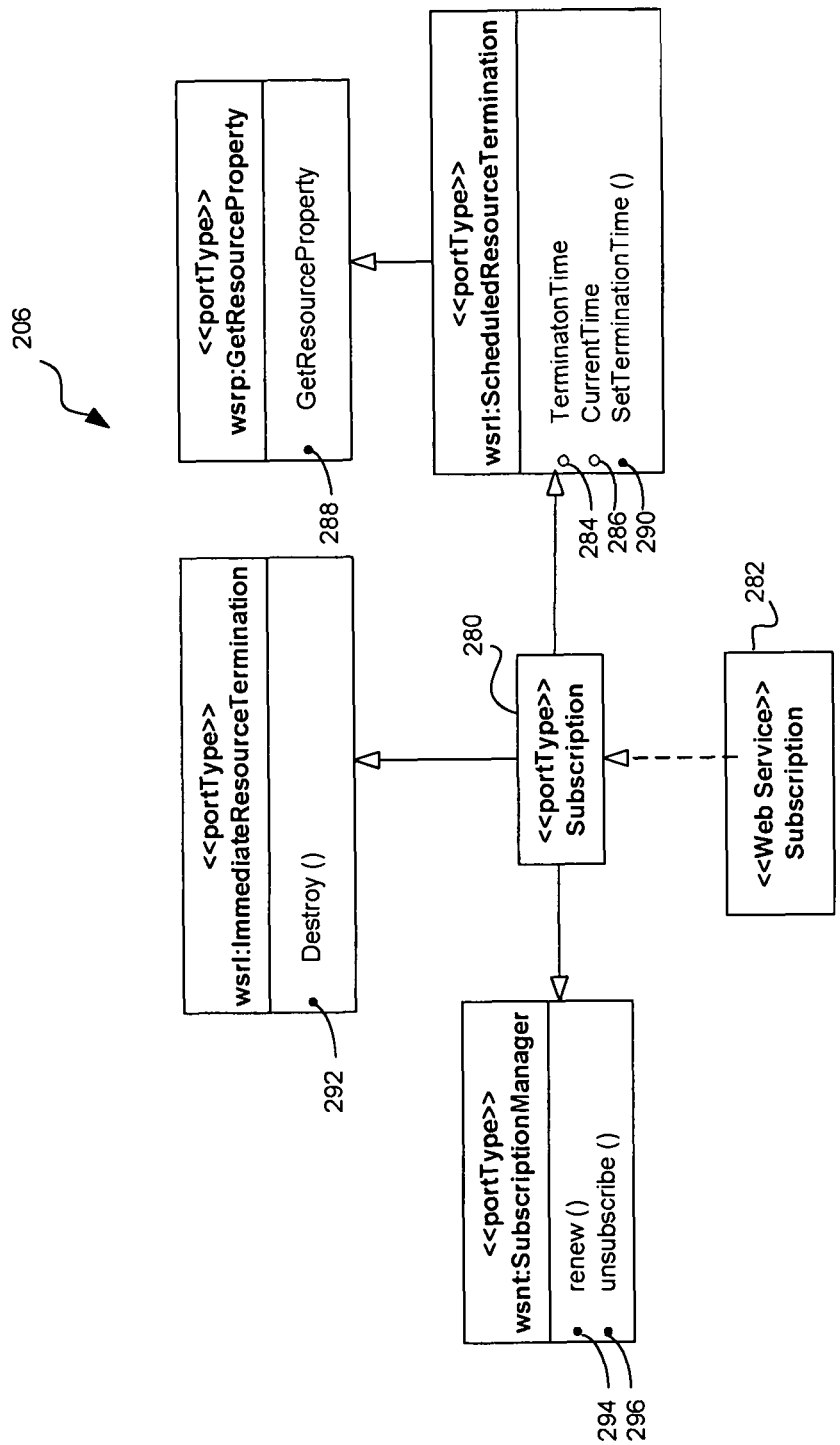
FIG. 6 is a block diagram illustrating a subscription port type in accordance with an exemplary embodiment.

With reference to FIG. 6, a block diagram illustrates the subscription in accordance with an exemplary embodiment. Subscriptions to the service group content modified topic will create subscription WS-Resources as shown in the UML diagram. The specific details describing the resource properties and operations for the subscription WS-Resource created by the topology are described in the following subsections.

As shown in FIG. 6, the subscription port type 280 is defined by properties and operations. The properties include a termination time property 284, and a current time property 286. The operations include a get resource property operation 288, a set termination time operation 290, a destroy operation 292, a renew operation 294, and an unsubscribe operation 296.

The termination time property 284 can be as defined by the ScheduledResourceTerimation portType in [WS-ResourceLifetime]. The value is initialized with the value specified by the wsnt:Subscribe/wsnt:InitialTerminationTime element at the time the subscription is created. The termination time for the topology does not include a time zone designation and can therefore be represented in universal time (UTC) format. The termination time property is mutable and read-only.

The current time resource property 286 can be as defined by the ScheduledResourceTerimation portType in [WS-ResourceLifetime]. The current time for the topology does not include a time zone designation and can therefore be represented in universal time (UTC) format. The current time property is mutable and read-only.

With regard to the operations, the get resource property operation 288 can be used by clients to retrieve the resource properties of the subscription 206. Given the number and simplicity of the properties, no other resource property operations are be defined (i.e. get multiple, get resource property document and query). The syntax for the get resource property operation request, response, and fault messages are specified in [WS-ResourceProperties].

The set termination time operation 290 is used by the client applications to adjust the termination time for the subscription 206. Both absolute and duration types of adjustments are supported by the termination time resource property. Calling the set termination time operation 290 has the same effect as calling the renew operation 294. The syntax for the set termination time operation 290 request, response, and fault messages are specified in [WS-ResourceLifetime].

The destroy operation 292 is used to destroy a subscription 282. Once destroyed no additional notifications are sent for the subscription 282. This has the same effect as calling the unsubscribe operation 296. The syntax for the destroy operation 292 request, response, and fault messages are specified in [WS-ResourceLifetime].

The renew operation is a simple delegation to the set termination time operation 290 for the subscription 282. The syntax for the renew operation 294 request, response, and fault messages are specified in [WS-BaseNotifcation].

The unsubscribe operation 296 is a simple delegation to the destroy operation 292 for the subscription 282. The syntax for the unsubscribe operation 296 request, response, and fault messages are specified in [WS-BaseNotification].

Figure 7:
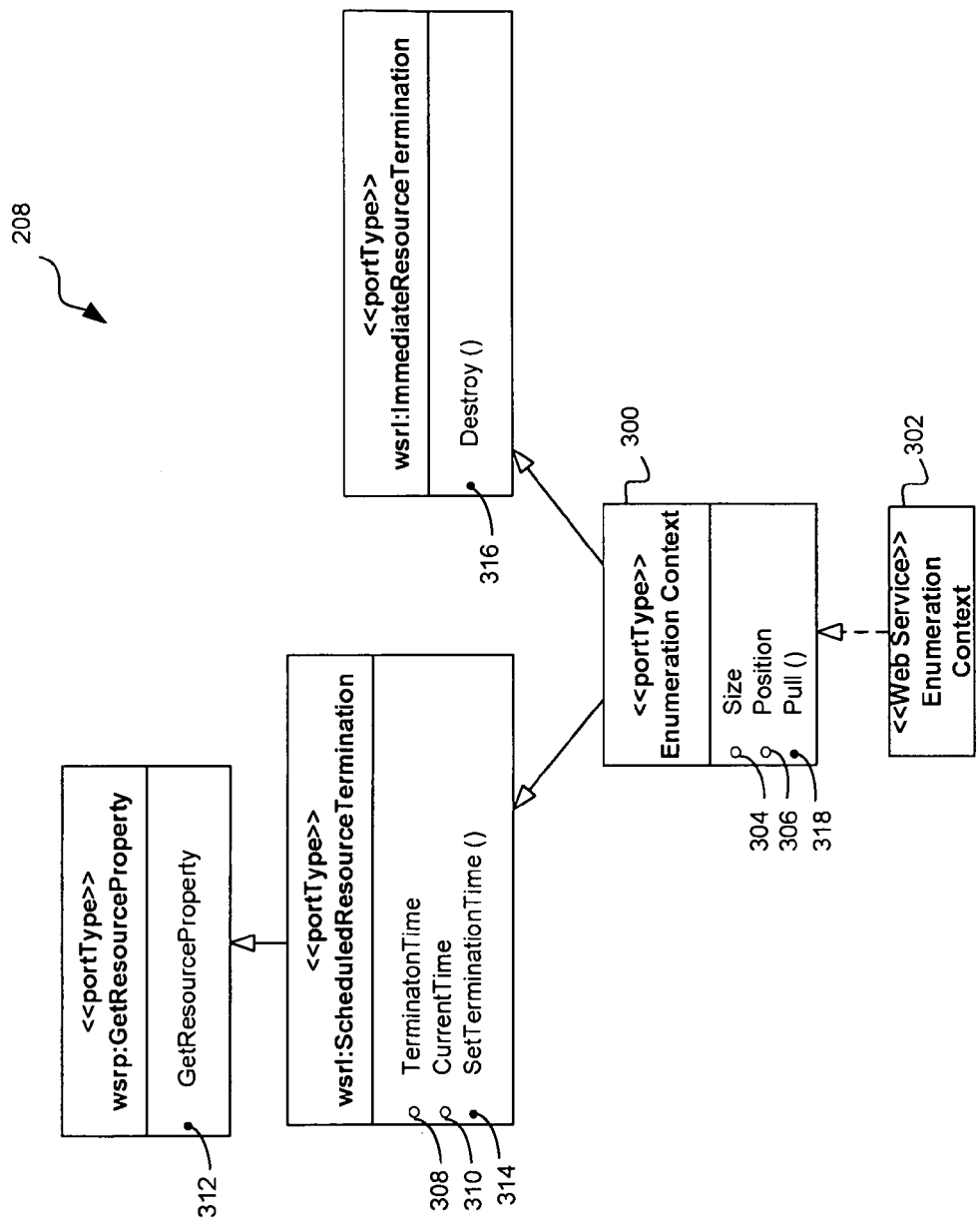
FIG. 7 is a block diagram illustrating an enumeration port type in accordance with an exemplary embodiment.

With reference to FIG. 7, a block diagram illustrates an enumeration in accordance with an exemplary embodiment. Enumeration resources are created by the topology for clients wishing to iterate over the graph. The UML diagram in FIG. 4-10 shows the specific port types that are assumed to be implemented by topology enumerations.

The enumeration 208 is defined by various properties and operations. The properties include a size property 304, a position property 306, a termination time property 308, and a current time property 310. The operations include a get resource property operation 312, a set termination time operation 314, a destroy operation 316, and a pull operation 318.

The size property 304 can be as defined in [WS-ResourceEnumeration]. This property defines the number of edges within the enumeration. The size property is mutable and read-only.

The position property 306 can be as defined in [WS-ResourceEnumeration]. The value is initialized to a value of one when the enumeration is first created. The position property is mutable and read-only.

The termination time property 308 can be as defined by the ScheduledResourceTerimation portType in [WS-ResourceLifetime]. The value is initialized with the value specified by the wsen:Enumeration/wsen:Expires element at the time the enumeration is created. The termination time for the topology does not include a time zone designation and can therefore be represented in universal time (UTC) format. The termination time property 308 is mutable and read-only.

The current time property 310 can be as defined by the ScheduledResourceTerimation portType in [WS-ResourceLifetime]. The current time for the topology does not include a time zone designation and can therefore be represented in universal time (UCT) format. The current time property 310 is mutable and read-only.

With regard to the operations, the syntax for the get resource property operation 312 request, response, and fault messages are specified in [WS-ResourceProperties]. The set termination time operation 314 is used by the client to adjust the termination time for the enumeration. Both absolute and duration types of adjustments can be supported by the termination time resource property.

The destroy operation 316 is used to destroy an enumeration. The syntax for the destroy operation 316 request, response, and fault messages are specified in [WS-ResourceLifetime]. The pull operation 318 is used to pull messages from an enumeration. The format of the pull operation 318 request, and response messages are as defined in [WS-ResourceEnumeration]. The items pulled from the enumeration can be complete edge elements. The topology does not support MaxTime or MaxCharacters. If either MaxTime or MaxCharacters is included in the pull request message, they will be silently ignored. The optional wsre:StartElement and wsre:RelativeElement elements are supported.

Assertions with respect to error recovery and process integrity errors are surfaced from the topology service in two different ways. The first and most common error scenario is through a fault returned by any of the web service operations. The resource topology factory produces a fault if a non-recoverable error occurs within the service itself. The most common cause for receiving this type of fault is having an incorrect input parameter.

The topology service can also produce an error while building the topology graph. The second type of error is considered a recoverable error that will not result in a fault being returned to the caller. The criteria used to differentiate between recoverable and non-recoverable errors if the completeness of the graph. If the failure results in not including an edge or being able to determine if an edge should be included will be considered irrecoverable, resulting in a fault being returned to the client application. If the failure results in the inability to include optional manageable resource or relationship properties within a node or link, then the error will be considered recoverable and not result in a fault.

Since a client may heavily depend on the success or failure of operations, they must be performed in a transactional context. The transactional requirements have been described for each operation using the terms and definitions defined by EJBs for declarative transaction management. The operation invocation is not required to run in the scope of a transaction, however if the client propagates an existing transaction context, this operation can run within the scope of that transaction. If a transaction does not exist, a new transaction can be created and used for the duration of the operation's processing.

As will be appreciated by one skilled in the art, the present invention may be embodied as a system, method or computer program product. Accordingly, the present invention may take the form of an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-useable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for managing topologies, comprising:
a topology data datastore that stores topology information;
a topology computer element that interfaces with the topology data datastore to create and update a topology of resources, wherein the topology computer element comprises a processor and maintains a generation identifier for the topology of resources, wherein the generation identifier represents a version of a state of the topology and has a value of one when the topology of resources is created and is monotonically increased each time the topology of resources is updated;
a subscription creation computer element that subscribes to a topology synchronization topic when the topology of resources is being created; and
a subscription computer element that generates notifications to a user based on at least one of the creating and the updating of the topology of resources and further based on the -topology synchronization topic, wherein each notification comprises the generation identifier for the topology of resources;
wherein the topology of resources represents resources and relationships within a customer information technology environment and comprises a termination time for a scheduled destruction of the topology of resources,
wherein creating and updating the topology of resources is based on a truncation rule, which truncates the topology of resources at a given starting node when a criteria specified in the truncation rule has been met, the truncation rule comprising a truncation threshold value used to specify when the topology of resources should be truncated based on a number of a same type of links and related nodes with a same starting node has been reached.

2. The system of claim 1 wherein the subscription computer element generates the notifications to the user based on the generation identifier.

3. The system of claim 1 wherein the topology element creates the topology based on Web Service resources.

4. The system of claim 1 wherein the topology computer element performs queries on the topology.

5. The system of claim 1 further comprising an enumeration computer element that generates iterations of at least one of the topology and the resources.

6. A method of managing dynamic resource topologies, comprising:
performing using a computer,
storing topology information in a computer datastore;
creating and updating a topology of resources based on the topology information in the computer datastore;
maintaining a generation identifier for the topology of resources, wherein the generation identifier represents a version of a state of the topology and has a value of one when the topology of resources is created and is monotonically increased each time the topology of resources is updated;
subscribing to a topology synchronization topic when the topology of resources is being created; and
generating notifications to a user based on the at least one of the creating and the updating of the topology of resources and further based on the topology synchronization topic, wherein each notification comprises the generation identifier for the topology of resources;
wherein the topology of resources represents resources and relationships within a customer information technology environment and comprises a termination time for a scheduled destruction of the topology of resources,
wherein creating and updating the topology of resources is based on a truncation rule, which truncates the topology of resources at a given starting node when a criteria specified in the truncation rule has been met, the truncation rule comprising a truncation threshold value used to specify when the topology of resources should be truncated based on a number of a same type of links and related nodes with a same starting node has been reached.

7. The method of claim 6 wherein the generating the notifications to the user is further based on the generation identifier.

8. The method of claim 6 wherein the creating the topology is based on Web Service resources.

9. The method of claim 6 further comprising performing queries on the topology.

10. The method of claim 6 further comprising generating iterations of at least one of the topology and the resources.

11. A computer program product for managing topologies, the computer program product comprising:
a non-transitory computer-readable storage medium that stores instructions that, when executed by a computer, implement a method for managing topologies, the method comprising:
storing topology information in a computer datastore;
creating and updating a topology of resources based on the topology information in the computer datastore;
maintaining a generation identifier for the topology of resources, wherein the generation identifier represents a version of a state of the topology and has a value of one when the topology of resources is created and is monotonically increased each time the topology of resources is updated;
subscribing to a topology synchronization topic when the topology of resources is being created; and
generating notifications to a user based on at least one of the creating and the updating of the topology of resources and further based on the topology synchronization topic, wherein each notification comprises the generation identifier for the topology of resources;

wherein the topology of resources represents resources and relationships within a customer information technology environment and comprises a termination time for a scheduled destruction of the topology of resources, wherein creating and updating the topology of resources is based on a truncation rule, which truncates the topology of resources at a given starting node when a criteria specified in the truncation rule has been met, the truncation rule comprising a truncation threshold value used to specify when the topology of resources should be truncated based on a number of a same type of links and related nodes with a same starting node has been reached.

12. The computer program product of claim 11 wherein the generating the notifications to the user is further based on the generation identifier.

13. The computer program product of claim 11 wherein the creating the topology is based on Web Service resources.

14. The computer program product of claim 11 wherein the method further comprises generating iterations of at least one of the topology and the resources.

* * * * *